(12) United States Patent
Whitney et al.

(10) Patent No.: US 11,454,830 B2
(45) Date of Patent: Sep. 27, 2022

(54) BLACK PHOSPHORUS OPTICAL MODULATORS FOR PHASE, AMPLITUDE AND POLARIZATION CONTROL

(71) Applicant: California Institute of Technology, Pasadena, CA (US)

(72) Inventors: William S. Whitney, Bellevue, WA (US); Michelle C. Sherrott, Pasadena, CA (US); Harry A. Atwater, Pasadena, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 160 days.

(21) Appl. No.: 16/723,108

(22) Filed: Dec. 20, 2019

(65) Prior Publication Data

US 2020/0201083 A1 Jun. 25, 2020

Related U.S. Application Data

(60) Provisional application No. 62/783,407, filed on Dec. 21, 2018.

(51) Int. Cl.
*G02F 1/00* (2006.01)
*G02F 1/03* (2006.01)
*B82Y 20/00* (2011.01)

(52) U.S. Cl.
CPC .......... *G02F 1/0018* (2013.01); *G02F 1/0316* (2013.01); *B82Y 20/00* (2013.01)

(58) Field of Classification Search
CPC . G02F 1/00; G02F 1/015; G02F 1/025; G02F 1/03; G02F 1/0018; G02F 1/0316; G02F 1/061; G02F 1/35; G02F 1/295; G02B 26/00; G02B 5/30; H01L 29/861; H01L 31/032; H01L 31/113; B82Y 10/00; B82Y 20/00
USPC ........ 359/245–247, 252, 254, 260, 261, 263
See application file for complete search history.

(56) References Cited

U.S. PATENT DOCUMENTS

| | | |
|---|---|---|
| 9,904,144 B1 | 2/2018 | Song et al. |
| 10,640,884 B2 | 5/2020 | Zhang et al. |
| 2017/0168327 A1 | 6/2017 | Han et al. |

FOREIGN PATENT DOCUMENTS

| | | |
|---|---|---|
| CN | 105428983 A | 3/2016 |
| CN | 108447924 A | 8/2018 |
| WO | 2017/121608 A1 | 7/2017 |

(Continued)

OTHER PUBLICATIONS

Fryett et al: "Cavity nonlinear optics with layered materials", Nanophotonics 2018; 7(2): p. 355-370; (Feb. 2018). (Year: 2018).*

(Continued)

*Primary Examiner* — Jie Lei
(74) *Attorney, Agent, or Firm* — Steinfl + Bruno, LLP (57) ABSTRACT

Resonant optical cavities incorporating black phosphorus to enable electrically tunable control of light are disclosed. Methods and devices are described that use black phosphorus as an electrically tunable optical material to control phase, amplitude and/or polarization of light from visible to mid-infrared wavelengths. The operating wavelength of the optical cavities depends on the thickness of the embedded black phosphorous. Tunable control of light is performed by adjusting the doping level of black phosphorous.

10 Claims, 8 Drawing Sheets

(56) References Cited

FOREIGN PATENT DOCUMENTS

| WO | 2017/166878 A1 | 10/2017 |
|----|----------------|---------|
| WO | 2020/132473 A1 | 6/2020  |

OTHER PUBLICATIONS

Arbabi et al., "Dieletric metasurfaces for complete control of phase and polarization with sub wavelength spatial resolution and high transmission" *Nature Nanotechnology*, 2015, 10, 937. 8 pages.

Huang et al., "Gate-Tunable Conducting Oxide Metasurfaces", *Nano Letters*, 2016, 16, (9), 5319-5325. 7 pages.

Iyer et al., "Electrically Reconfigurable Metasurfaces Using Heterojunction Reasonators", *Advanced Optical Materials*, 2016, 4, (10), 1582-1588. 7 pages.

Kildishev et al., Planar Photonics with Metasurfaces *Science*, 2013, 339, (6125). 8 pages.

Li et al., "Dirac charge dynamics in graphene by infrared spectroscopy" *Nature Physics*, 2008, 4, (7), 532-535. 4 pages.

Lin et al., "Multilayer Black Phosphorus as a Versatile Mid-Infrared Electro-optic Material", *Nano Letters*, 2016, 16, (3), 1683-9. 7 pages.

Peng et al., "Midinfrared Electro-optic Modulation in Few-Layer Black Phosphorus", *Nano Letters*, 2017, 17, (10), 6315-6320. 6 pages.

Sherrott et al., "Electrical Control of Linear Dichroism in Black Phosphorus from the Visible to Mid-Infrared",*California Institute of Technology*, 2017. 18 pages.

Sherrott et al., Experimental Demonstration of 320° Phase Modulation in Gate-Tunable Graphene-Gold Reconfigurable Mid-Infrared Metasurfaces. *Nano Letters*, 2017, 17, (5), 3027-3034. 8 pages.

Sun et al., "Optical modulators with 2D layered materials" Nature Photonics, 2016, 10, (4), 227-238. 12 pages.

Wang et al., "A Broadband achromatic metalens in the visible" *Nature Nanotechnology*, 2018, 13, (3), 227-232. 6 pages.

Whitney et al., "Field Optoelectronic Modulation of Quantum-Confined Carriers in Black Phosphorus", *Nano Letters*, 2017, 17, (1), 78-84. 7 pages.

Xia et al., "Rediscovering black phosphorus as an anisotropic layered material for optoelectronics and electronics", *Nature Communications*, 2014, 5, 4458. 6 pages.

Yu et al., "Giant Gating Tunability of Optical Refractive Index in Transition Metal Dichalcogenide Monolayers", Nano Letters, 2017, 17, (6), 3613-3618. 6 pages.

Yu et al., "Flat optics with designer metasurfaces" Nature Materials, 2014, vol. 13 , 139. 12 pages.

Zhang et al., "Infrared fingerprints of few-layer black phosphorus", *Nature Communications*, 2017, 8, 14071. 9 pages.

Zheng et al., "Metasurface holograms reaching 80% efficiency" Nature Nanotechnology, 2015, 10, 308. 6 pages.

International Search Report for International PCT Application No. PCT/US2019/067901 filed on Dec. 20, 2019 on behalf of California Institute of Technology, dated Apr. 21, 2020. 3 Pages.

Written Opinion for International PCT Application No. PCT/US2019/067901 filed on Dec. 20, 2019 on behalf of California Institute of Technology, dated Apr. 21, 2020. 5 Pages.

\* cited by examiner

BLACK PHOSPHORUS OPTICAL MODULATORS FOR PHASE, AMPLITUDE AND POLARIZATION CONTROL

CROSS REFERENCE TO RELATED APPLICATIONS

The present application claims priority to U.S. Provisional Application 62/783,407 filed on Dec. 21, 2018, the contents of which are incorporated herein by reference in their entirety.

FIELD

The presented disclosure is related to devices and methods for control of physical properties of light such as amplitude, phase and polarization, such as resonant optical cavities, and more particularly to optical cavities incorporating black phosphorus to enable electrically tunable control of light.

BACKGROUND

Over the past several years, an expanding range of passive metasurface devices have been developed to control the amplitude, phase, and polarization of incident light. A challenge for nanophotonics is to develop active metasurfaces that can control these variables as a function of time, allowing the complete control of radiation. When reconfigured electrically, such metasurface devices can replace complex, bulk optical systems with simple, chip-based alternatives that provide tailored photonic functionality with high switching speeds. These active metasurfaces can be designed for complex wavefront engineering, including directional steering of reflected or transmitted light. With ideal phase control, arbitrary 2D holography can be performed. However, the design of nanophotonic unit cell building blocks for such devices, which must provide phase modulation with low loss, remains a challenge for existing photonic materials.

Independently, the field and family of two-dimensional materials is rapidly expanding. These ultra-thin, layered materials are promising tunable elements for incorporation into active photonic nanostructures and metasurfaces. It has been shown that Van der Waals materials may be fabricated into atom-scale structures, and their optical properties can be changed dramatically under applied electric fields due to a range of electro-optical effects.

SUMMARY

Black phosphorus is a new and compelling candidate for van der Waals optoelectronics. This layered, semiconducting allotrope of phosphorus evolves continuously from a bulk-like semiconductor to a natural quantum well structure when thinned down to the few-layer limit. As the layer count is reduced, quantum confinement increases the band gap from 0.3 eV in bulk to approximately 2 eV for monolayers. In this regime, few-layer black phosphorus exhibits tunable optoelectronic behavior similar to that seen in compound semiconductor quantum well structures, which are effective amplitude and phase modulators. In addition, the anisotropic crystal structure of black phosphorus induces severe anisotropy in its electronic, thermal, and optical properties. This anisotropy opens the door for compelling new physics, such as hyperbolic plasmons, and technology applications, such as polarization control and beam-steering of propagating surface waves.

One metric by which to compare tunable optical materials is the electrically-induced change in the real part of the refractive index, divided by its imaginary part. For plasmonic materials with high loss, large refractive index tunability can be achieved, but this ratio remains relatively low. The same is true of tunable excitonic features in 2D materials. For this reason, tunable dielectric structures such as semiconductor quantum wells are promising. Few-layer black phosphorus, which acts as a natural, anisotropic quantum well, has been shown to exhibit superlative electro-optical complex refractive index modulation in both low and high absorption spectral regions, and so is a favorable candidate for this application.

The disclosed methods and devices address the described challenges and provide practical solutions to the above-mentioned problems.

Dynamic control of the flow of light at the nanoscale is a critical element of next-generation optoelectronic devices. Ultra-thin, layered materials are promising building blocks for this functionality, as they can be fabricated into atom-scale structures, and their optical properties change dramatically under applied electric fields. Based on the teachings of the present disclosure, it is shown that a double distributed Bragg reflector microcavity loaded with black phosphorus acts as an effective, anisotropic phase, amplitude, and polarization modulation device. The disclosed devices can enhance the light-matter interactions in the black phosphorus, and create an optically resonant structure that can be dynamically tuned to achieve a range of reflected phase and amplitude values. Additionally, due to the intrinsic, in-plane anisotropy of black phosphorus, embodiments in accordance with the present disclosure can also function as an electrically tunable waveplate and/or linear polarizer. Importantly, these devices can be tuned for operation at a range of technologically valuable wavelengths throughout the near-infrared by adjusting the thickness of the black phosphorus layer (and the accompanying microcavity), which spectrally shifts its band gap and optical response.

According to a first aspect of the present disclosure, an optical device is disclosed, providing a black phosphorous layer embedded in an optical cavity, the optical device being configured to: receive an input light to generate an output light; receive a control voltage to control a doping level of the black phosphorous layer to modulate, based on a polarization state of the input light, a) a phase of the input light, b) an amplitude of the input light, or c) a polarization of the input light or a combination thereof.

According to a second aspect of the present disclosure, a method of modulating input light received by an optical cavity to generate an output light is disclosed, comprising: embedding a black phosphorous layer within the optical cavity; based on a polarization state of the input light, modulating amplitude, phase, or polarization of the input light, by controlling a doping level of the black phosphorous layer.

Further aspects of the disclosure are provided in the description, drawings and claims of the present application.

DETAILED DESCRIPTION

Throughout this document, the terms "armchair axis" and "zigzag axis" refer to the two in-plane axes of the phosphorous crystal that are perpendicular to each other. More in particular, the term "armchair axis" refers to the crystal axis which is highly electrically tunable. The term "zigzag axis" refers to the crystal axis which has a negligible tunability.

Figure 1A:
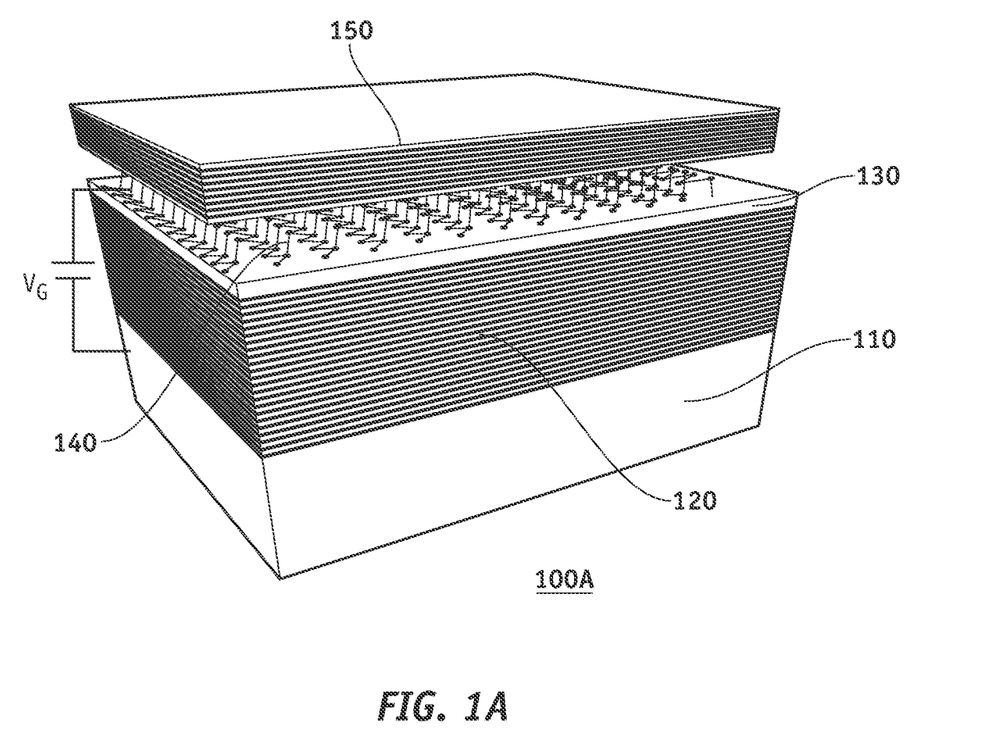
FIGS. 1A-1B show an exemplary optical cavity in accordance with an embodiment of the present disclosure.
Figure 1B:
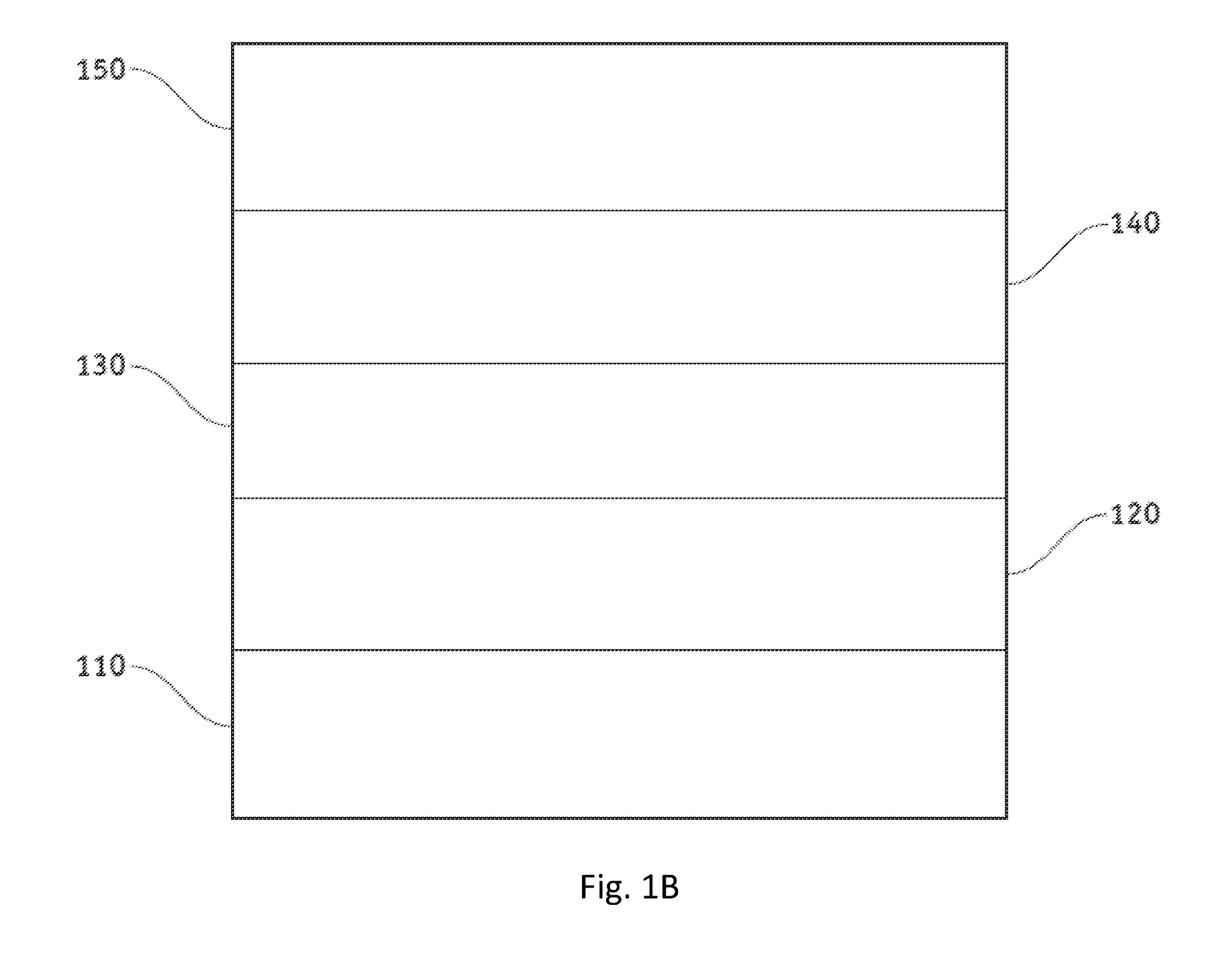

FIG. 1A shows an exemplary optical cavity (100A) in accordance with an embodiment of the present disclosure. The optical cavity (100A) comprises a substrate (110), a bottom reflector (120), a gate dielectric (130), a black phosphorous layer (140), and a top reflector (150). FIG. 1B shows a cross section of the optical cavity (100A).

According to various embodiments of the present disclosure:

- the optical cavity (100A) may be manufactured according to a double distributed Bragg reflector (DBR) structure, although structures other than a DBR structure may also be envisaged
- the substrate is made of GaAs although other similar materials may also be envisaged
- the bottom and top reflector comprise several layers, each including a pair of a first reflector layer with a second reflector layer atop the first reflector layer, the first and the second reflector layers being made from different materials. By way of example, and not of limitation, bottom reflector (120) may be a DBR comprising 40 pairs of $AlAs/Al_{0.1}Ga_{0.9}$ while top reflector (150) may be a DBR comprising 10 pairs of $SiO_2/SiN_x$.
- in the case of the DBR structure, the reflector layers have thicknesses of $\lambda/4n$ where $\lambda$ represents the nominal operating wavelength and n is the refractive index of each layer.
- the gate dielectric may be made of $Al_2O_3$ with a thickness within the nm range (e.g. 10 nm)
- the black phosphorous layer (140) may have a thickness within the nm range (e.g. 1 to 10 nm)
- optical cavity (100A) is resonant below the band edge of the black phosphorus where absorption is low but substantial refractive index changes with doping persist The voltage (VG) is applied across the black phosphorous layer (140) and the substrate (110) to inject carriers into the black phosphorous layer. By varying the applied voltage (VG), different doping levels may be created. As will be described more in detail later, and through exemplary performance results, varying the doping level of black phosphorous controls the tunability of the optical cavity (100A) when functioning as an anisotropic phase, amplitude, and polarization modulator. According to embodiments of the present disclosure, the thickness of the black phosphorous layer (140) changes the band structure of the phosphorous and this determines the wavelength at which the optical cavity (100) will provide the desired functionality. In practice, the operation wavelength may be selected based on the application, and then the black phosphorous thickness and the optical cavity structure may be adjusted to accommodate the selected wavelength of operation.

With reference to FIGS. 1A-1B, in order to model the phase and amplitude modulation possible in the optical cavity (100), the inventors have used transfer matrix methods such as those adopted by the Lumerical® FDTD software package to calculate reflected phase and intensity as the black phosphorus refractive index is varied. In particular, black phosphorus with an exemplary thickness of 5 nm has been modeled to generate a series of results that will be discussed throughout the present disclosure, Modulation of the zig-zag axis refractive index has been assumed to be negligible throughout the modeling process.

Figure 2A:
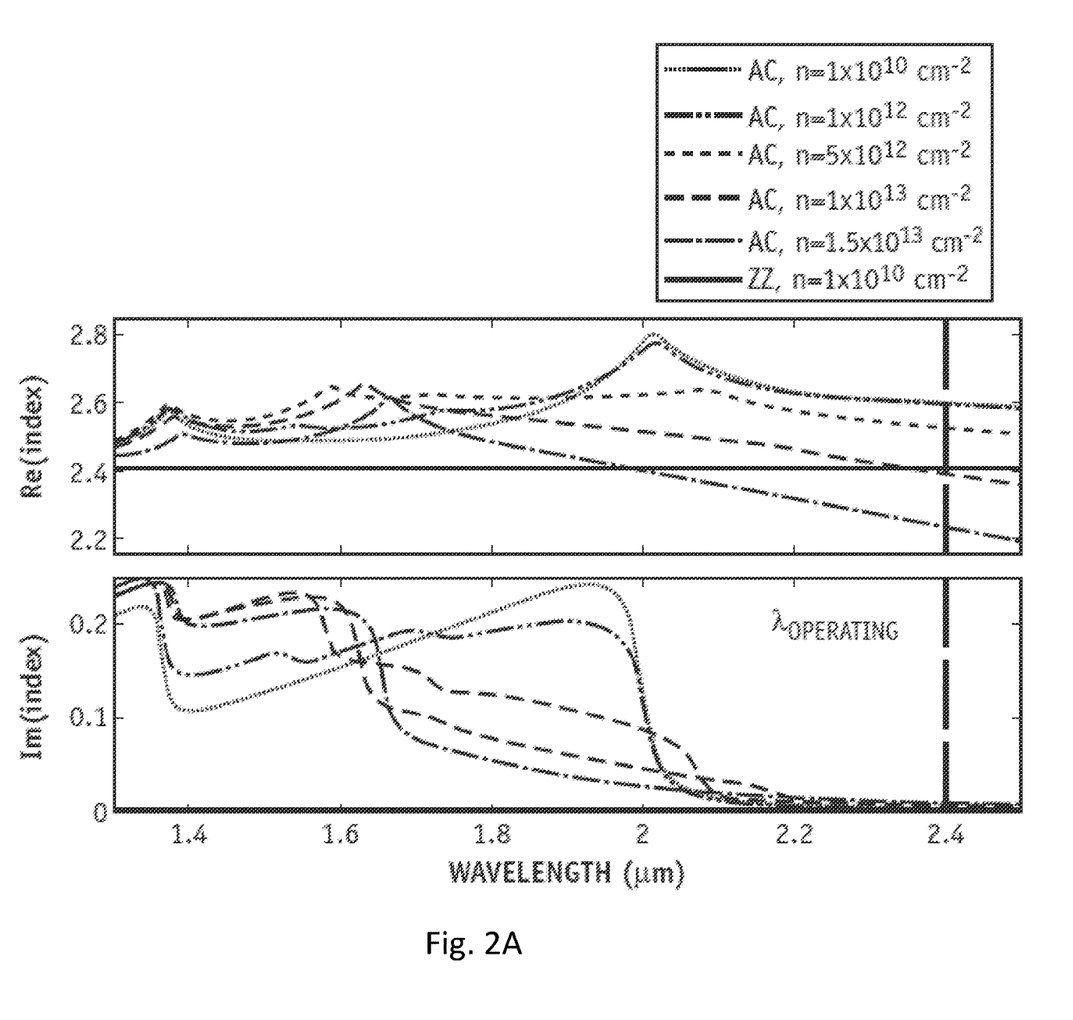
FIGS. 2A-2F show performance results of exemplary optical cavities according to embodiments of the present disclosure.
Figure 2B:
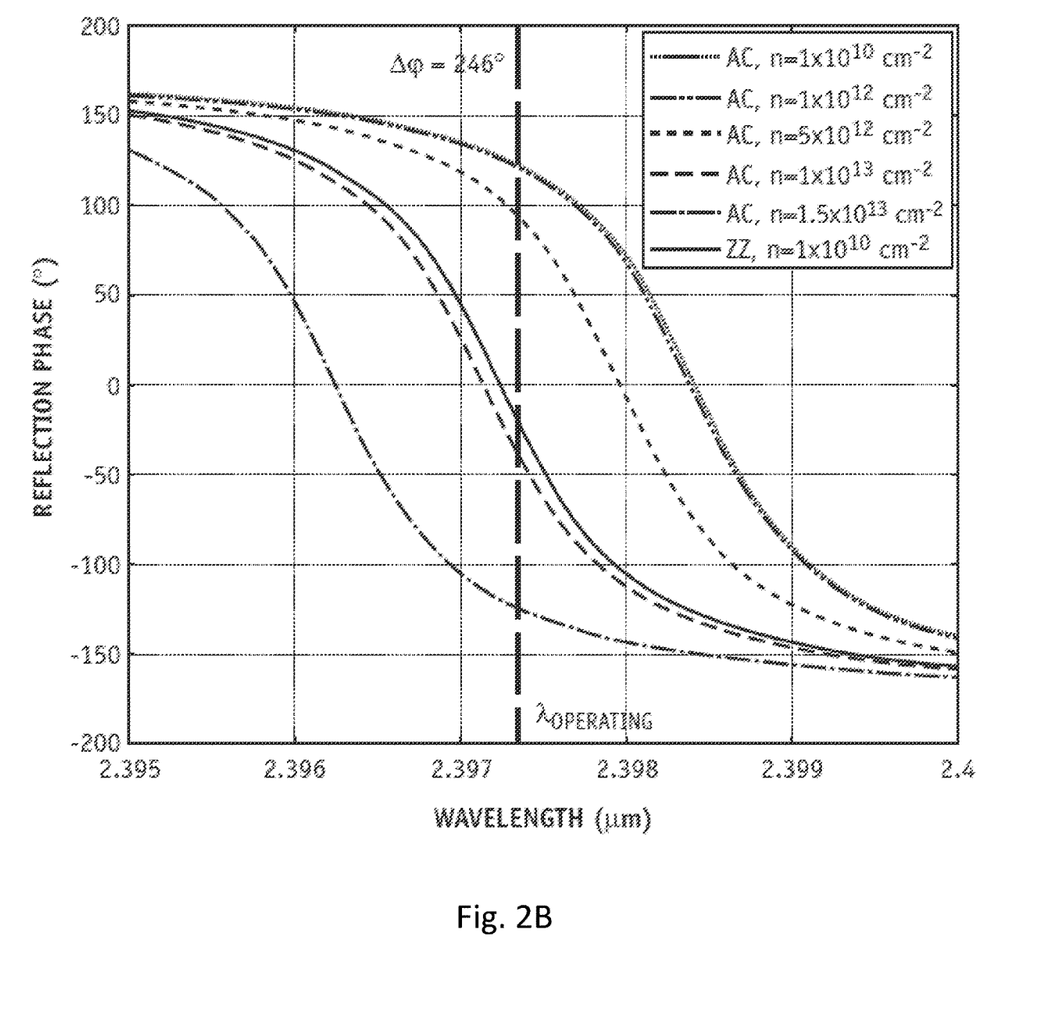
Figure 2C:
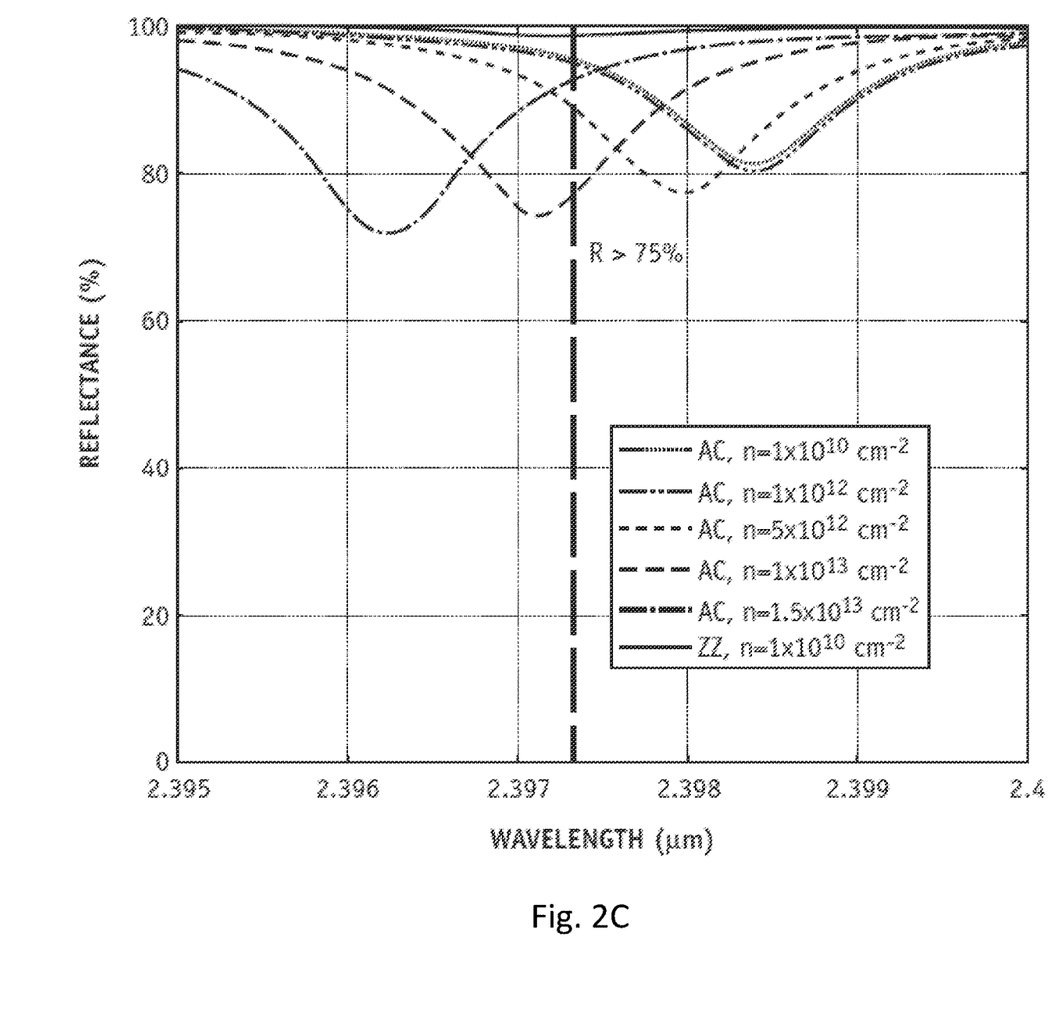

The calculated phase and amplitude modulation results for the structure of FIGS. 1A-1B are presented in FIGS. 2A-2C. FIG. 2A shows real and complex refractive index for 5 nm black phosphorus under electrostatic gating to various charge densities. FIG. 2B shows the calculated reflected phase response for the optical cavity (100A) of FIG. 1A, for light polarized along each crystal axis and a range of injected carrier densities. FIG. 2C shows the calculated reflectance intensity for the optical cavity (100A) of FIG. 1A, for light polarized along each crystal axis and the same range of injected carrier densities.

The large change in complex refractive index with charge injection, illustrated in FIG. 2A, generates strong phase modulation across the optical resonance. As shown in FIGS. 2B-2C, reflected phase is tuned across 246 degrees at approximately 2.4 µm for the optical cavity (200) of FIGS. 1A-1B, while reflectance intensity is maintained above 75 percent. To the best of the inventors' knowledge, the observed high phase modulation and low reflectance loss surpass the performance of existing electrically-tunable, far-field devices. Further, the armchair-axis reflected phase value sweeps through the zig-zag axis value near a carrier density of $1 \times 10^{13}$ cm$^{-2}$. As a result, while the optical cavity (100) of FIGS. 1A-1B may function as a standard phase modulator for light linearly polarized along the armchair crystal axis, for other polarizations such cavity may act as an electrically tunable waveplate, converting circularly or elliptically polarized light to linearly polarized light and vice versa.

Figure 2D:
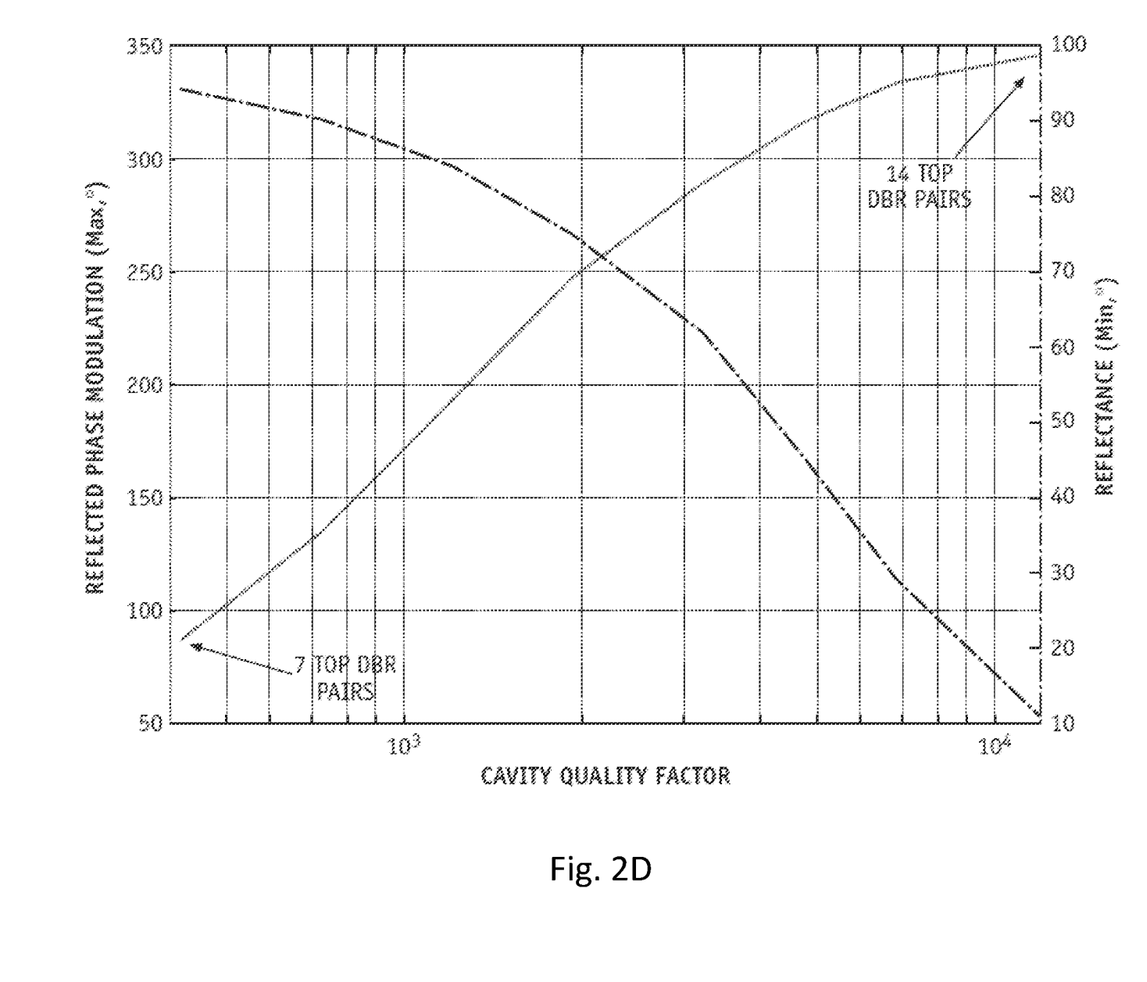

According to the teachings of the present disclosure, the quality factor of the optical cavity (100) increases by increasing the number of pairs in the top (150) and bottom (120) reflectors. As such quality factor is increased, the reflected phase modulation increases, but the reflectance intensity minimum decreases. This tradeoff, which allows the performance of the optical cavity (100) to be optimized for a given application, is illustrated in FIG. 2D.

Figure 2E:
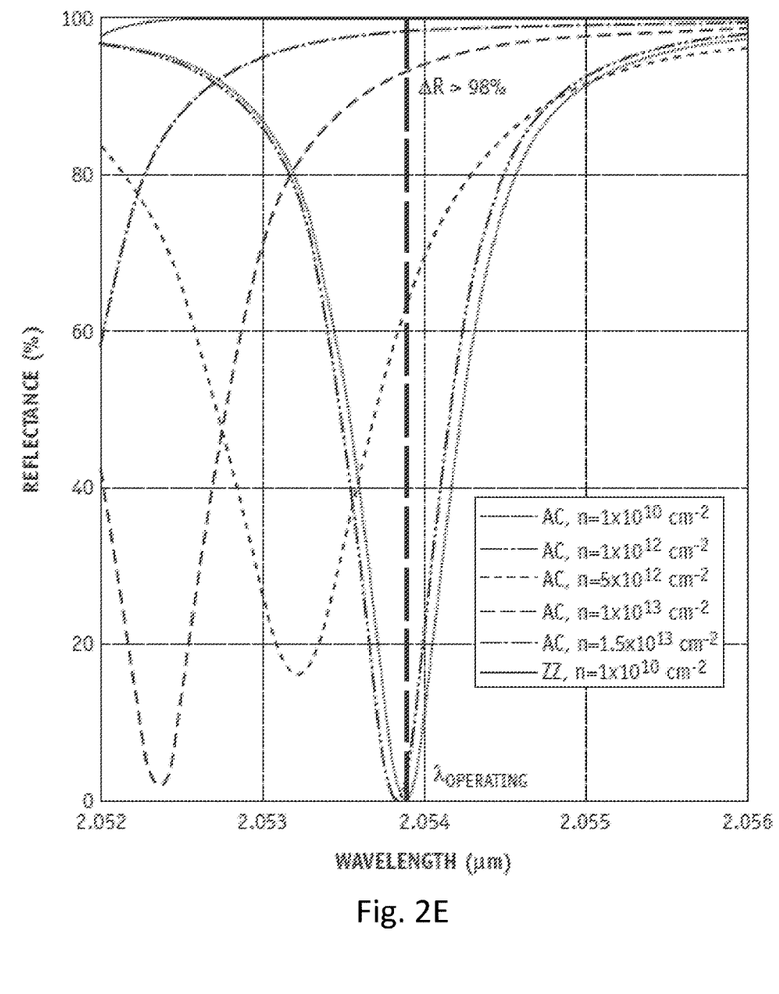
Figure 2F:
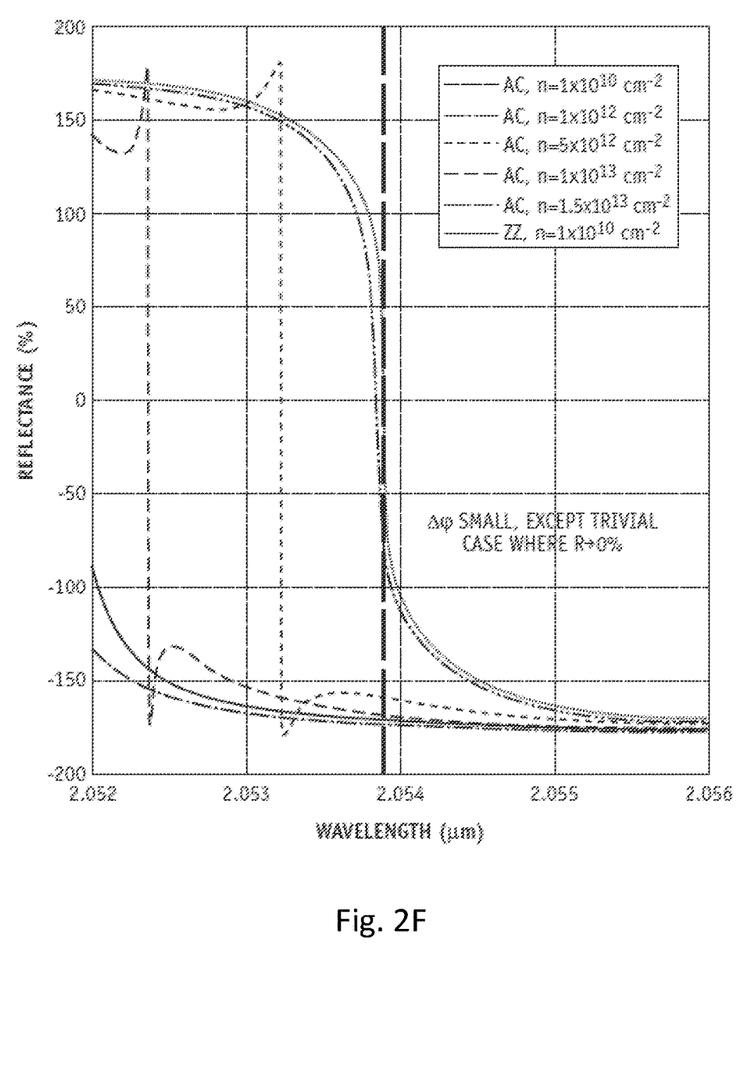

By scaling the operating frequency of the cavity, different embodiments in accordance with the present disclosure may be envisaged. By way of example, in what follows, the performance of the optical cavity (100A) is described in an embodiment where the top reflector (150) comprises 12 pairs of different materials, the embodiment operating at 2.1 µm. In general, the optical cavity (100A) may be made to create a resonance at a target wavelength. For amplitude modulation, this may be done near the band edge, to allow significant absorption. For phase modulation, this is done significantly sub-gap, to minimize absorption. The thicknesses of each of the individual reflector layers are all quarter-wavelength to generate the resonant optical response of the distributed Bragg reflector. For this case, FIG. 2E shows the calculated reflectance intensity response for light polarized along each crystal axis and a range of injected carrier densities, and FIG. 2F shows the calculated reflected phase response for light polarized along each crystal axis and the same range of injected carrier densities. As can be noticed, more than 98% modulation depth is observed, with an off-state reflectance below 0.1%. Minimal reflected phase modulation is also observed, except in the trivial case where the reflectance is near zero, indicating nearly pure amplitude modulation. Further, the armchair-axis reflectance intensity closely approaches that of the zig-zag axis at a carrier density of $1.5 \times 10^{13}$ cm$^{-2}$. As a result, while the optical cavity (100) acts as a standard amplitude modulator for light linearly polarized along the armchair crystal axis, it also can function as an electrically tunable linear polarizer for other polarizations, able to convert unpolarized light to linearly polarized light on demand.

The exemplary performances described above correspond to two different cases wherein the optical cavity (100) operates at wavelengths around 2.4 and 2.1 um. Other embodiments in accordance with the teachings of the present disclosure may also be envisaged wherein changing the thickness of the black phosphorus layer allows its band structure and complex refractive index to be tuned through the near-infrared and into the visible. The operating wavelength of the cavity structures described here can be tuned as well, to allow efficient modulation at any of the technologically important bands within this wavelength range, such as the 1550 nm C band used for telecommunications.

What is claimed is:

1. An optical device configured to receive an input light and generate an output light, the optical device comprising
    an optical cavity comprising a black phosphorous layer on a dielectric gate layer, the dielectric gate layer being above a substrate, the black phosphorus layer having a set thickness and voltage-controllable doping levels, and
    a voltage input on the black phosphorous layer configured to receive a control voltage applied across the black phosphorous layer and the substrate to vary a doping level of the black phosphorous layer,
    wherein variation of the doping level of the black phosphorous layer modulates, based on the set thickness and a polarization state of the input light,
        a) a phase of the input light,
        b) an amplitude of the input light, or
        c) a polarization of the input light or a combination thereof;
    wherein the optical cavity includes a top and a bottom reflector; the top reflector being placed on the black phosphorous layer, and the bottom reflector being placed on the substrate;
    wherein the top reflector comprises a plurality of top layers, each top layer including a pair of a first top reflector layer and a second top reflector layer placed on the first top reflector layer, the first and the second top reflector layers being made of different materials, and the bottom reflector comprises a plurality of bottom layers, each bottom layer including a pair of a first bottom reflector layer and a second bottom reflector layer placed on the first bottom reflector layer, the first and the second bottom reflector layer being made from different materials;
    wherein each first top reflector layer comprises $SiO_2$, each first bottom reflector layer comprises AlAs, and each second bottom reflector layer comprises $Al_{0.1}Ga_{0.9}$.

2. The optical device of claim 1 having an operating wavelength set as a function of the set thickness of the black phosphorous layer and a structure of the optical cavity.

3. The optical device of claim 1 implemented as a phase modulator, wherein the input light is linearly polarized along an armchair axis of the black phosphorous layer.

4. The optical device of claim 1 implemented as an electrically tunable waveplate, wherein the input light is circularly or elliptically polarized and the output light is linearly polarized.

5. The optical device of claim 1 implemented as an electrically tunable waveplate, wherein the input light is linearly polarized and the output light is circularly or elliptically polarized.

6. The optical device of claim 1 implemented as an amplitude modulator, wherein the input light is linearly polarized along an armchair axis of the black phosphorous layer.

7. The optical device of claim 1 implemented as a linear polarizer, wherein the input light is unpolarized and the output light is linearly polarized.

8. The optical device of claim 1, wherein the black phosphorous layer has a thickness in a range of 1 to 10 nm.

9. The optical device of claim 1, wherein thicknesses of the first and second top reflectors and the first and second bottom reflectors are selected based on an operating wavelength of the optical device.

10. The optical device of claim 1, wherein the optical cavity is resonant below a band edge of the black phosphorous layer.

* * * * *